(12) United States Patent
Irie et al.

(10) Patent No.: US 9,375,758 B2
(45) Date of Patent: Jun. 28, 2016

(54) SORTING DEVICE AND SORTING METHOD

(71) Applicant: Kabushiki Kaisha Toshiba, Tokyo (JP)

(72) Inventors: Bunpei Irie, Kanagawa-ken (JP);
Tomoyuki Hamamura, Tokyo (JP);
Masaya Maeda, Kanagawa-ken (JP);
Ying Piao, Tokyo (JP); Yuka Watanabe, Tokyo (JP); Kenji Baba, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/488,743

(22) Filed: Sep. 17, 2014

(65) Prior Publication Data
US 2015/0076041 A1 Mar. 19, 2015

(30) Foreign Application Priority Data

Sep. 18, 2013 (JP) ................................. 2013-193445

(51) Int. Cl.
*B07C 5/00* (2006.01)
*G06K 9/68* (2006.01)
(Continued)

(52) U.S. Cl.
CPC ... *B07C 5/00* (2013.01); *G06K 9/03* (2013.01); *G06K 9/3208* (2013.01); *G06K 9/4633* (2013.01); *G06K 9/68* (2013.01)

(58) Field of Classification Search
CPC .............. B07C 3/00; B07C 3/10; B07C 3/20; B07C 5/04; B07C 5/16; B07C 5/34; B07C 2301/0066; G06K 9/68; G06K 9/4633
See application file for complete search history.

(56) References Cited

U.S. PATENT DOCUMENTS 5,311,999 A * 5/1994 Malow ...................... B07C 3/14
209/583
6,888,084 B1 * 5/2005 Bayer ....................... B07C 3/00
209/584

(Continued)

FOREIGN PATENT DOCUMENTS

EP 2722815 A1 4/2014
JP 2003-510183 A 3/2003
(Continued)

OTHER PUBLICATIONS

Extended European Search Report issued in related European application No. 14184861.4 mailed on Dec. 10, 2015 (10 pages).
(Continued)

*Primary Examiner* — Joseph C Rodriguez
(74) *Attorney, Agent, or Firm* — Baker Botts L.L.P.

(57) ABSTRACT

A sorting device has sensors, a plurality of a feature extracting unit, a feature searching unit, a determining unit and a sorting unit. The sensors detect physical quantities of an object. The feature extracting unit extracts values of a plurality of types of feature values from the physical quantities detected. The feature searching unit specifies identification information of the object based on values of various feature values extracted with reference to a feature database which associates and stores the values of the various feature values and the identification information of the object in advance. The determining unit determines sorting information of the object based on the identification information of the object specified with reference to a sorting database which associates and stores the identification information of the object and the sorting information in advance. The sorting unit sorts the object based on the sorting information determined.

15 Claims, 10 Drawing Sheets

(51) Int. Cl.
*G06K 9/32* (2006.01)
*G06K 9/46* (2006.01)
*G06K 9/03* (2006.01)

(56) References Cited

U.S. PATENT DOCUMENTS

| | | | |
|---|---|---|---|
| 6,947,574 B1 * | 9/2005 | Graulich | B07C 3/14 209/584 |
| 7,258,277 B2 * | 8/2007 | Baker | B07C 3/14 235/375 |
| 7,356,162 B2 * | 4/2008 | Caillon | B07C 3/00 382/101 |
| 8,059,861 B2 * | 11/2011 | Li | B07C 3/00 209/584 |
| 8,713,034 B1 * | 4/2014 | Curtis | G06F 17/30616 707/748 |
| 2006/0008151 A1 | 1/2006 | Lin et al. | |
| 2008/0219560 A1 * | 9/2008 | Morimoto | G06K 9/38 382/195 |
| 2010/0014706 A1 * | 1/2010 | Rosenbaum | B07C 3/00 382/101 |
| 2010/0274383 A1 * | 10/2010 | Wilke | B07C 3/00 700/223 |
| 2012/0020558 A1 | 1/2012 | Yoshii | |
| 2013/0048722 A1 | 2/2013 | Davis et al. | |
| 2014/0236345 A1 * | 8/2014 | Schererz | B07C 1/10 700/223 |
| 2015/0356374 A1 * | 12/2015 | Mase | G06K 9/4671 382/195 |

FOREIGN PATENT DOCUMENTS

| | | |
|---|---|---|
| WO | 2009/110538 A1 | 9/2009 |
| WO | 2012173193 A1 | 12/2012 |
| WO | 2013033442 A1 | 3/2013 |

OTHER PUBLICATIONS

Saenko et al.: "Practical 3-D Object Detection using category and instance-level appearance models", Intelligent Robots and Systems (IROS), 2011 IEEE/RSJ International Conference ON, IEEE, Sep. 25, 2011, pp. 793-800, XP032201197, DOI: 10.1109/IROS.2011. 6095000, ISBN: 978-1-61284-454-1.

* cited by examiner

| VALUE OF FIRST FEATURE VALUE | ID OF OBJECT |
|---|---|
| 0 | |
| 1 | 3,5 |
| 2 | 2 |
| 3 | |
| 4 | 1,8 |
| 5 | 9 |
| 6 | 4,6,7 |
| 7 | |

105U2

| VALUE OF SECOND FEATURE VALUE | ID OF OBJECT |
|---|---|
| 0 | 1,2 |
| 1 | |
| 2 | 4 |
| 3 | 3 |
| 4 | 8 |
| 5 | |
| 6 | 5,6,7 |
| 7 | 9 |

105U3

| VALUE OF THIRD FEATURE VALUE | ID OF OBJECT |
|---|---|
| 0 | |
| 1 | 2,4 |
| 2 | 5,7 |
| 3 | 6,9 |
| 4 | |
| 5 | 1,3 |
| 6 | |
| 7 | 8 |

105U4

| VALUE OF FOURTH FEATURE VALUE | ID OF OBJECT |
|---|---|
| 0 | |
| 1 | 2,4 |
| 2 | 5 |
| 3 | 3 |
| 4 | 6 |
| 5 | 7 |
| 6 | 1,8,9 |
| 7 | |

| ID OF OBJECT | VOTE COUNT |
|---|---|
| 0 | |
| 1 | 2 |
| 2 | 1 |
| 3 | 6 |
| 4 | |
| 5 | 2 |
| 6 | 2 |
| 7 | 1 |
| 8 | 2 |
| 9 | |

106

MAXIMUM VALUE

ID OF OBJECT = 3 AS IDENTIFICATION RESULT

SORTING DEVICE AND SORTING METHOD

CROSS-REFERENCE TO RELATED APPLICATION(S)

This application is based upon and claims the benefit of priority from the prior Japanese Patent Application No. 2013-193445, filed on Sep. 18, 2013, the entire contents of which are incorporated herein by reference.

FIELD

An embodiment of the present invention relates to a sorting device and a sorting method.

BACKGROUND

A sorting device sorts objects based on sorting information such as addresses. For example, in sorting processing (sorting session), the sorting device obtains object images including sorting information such as characters or codes, recognizes the sorting information included in the obtained images, and sorts the objects based on the sorting information obtained as a recognition result. The sorting device performs sorting processing (sorting session) a plurality of times on individual objects to precisely sort the objects. In first sorting processing, the sorting device prints identification information (e.g. barcodes) on objects, associates and stores the printed identification information and sorting information read from the objects, and sorts the objects based on the sorting information. In second and subsequent sorting processing, the sorting device specifies the sorting information of the object based on the printed identification information, and sorts the object based on the specified sorting information.

However, there is a problem that it is necessary to provide a printing mechanism to the sorting device to print identification information on objects, and it is difficult to print identification information depending on object shapes and properties.

BRIEF DESCRIPTION OF THE DRAWINGS

FIG. 3 is a view illustrating an example of a configuration of feature database of the identifying unit of the sorting device according to the embodiment.

FIG. 8 is a view illustrating an example of the vote table illustrating a voting result.

DETAILED DESCRIPTION

According to the embodiment, a sorting device has sensors, a feature extracting unit, a feature searching unit, a determining unit and a sorting unit. The sensors detect physical quantities of an object. The feature extracting unit extracts a plurality of types of feature values from the physical quantities of the object detected by the sensors. The feature searching unit specifies identification information of the object based on values of various feature values extracted by the feature extracting unit, from a feature database which associates the values of the various feature values and the identification information of the object and stores the values of the various feature values and the identification information of the object. The determining unit determines sorting information of the object based on the identification information of the object specified by the feature searching unit, from a sorting database which associates the identification information of the object and the sorting information and stores the identification information of the object and the sorting information. The sorting unit sorts the object based on the sorting information determined by the determining unit.

The embodiment will be described below with reference to the drawings.

Figure 1:
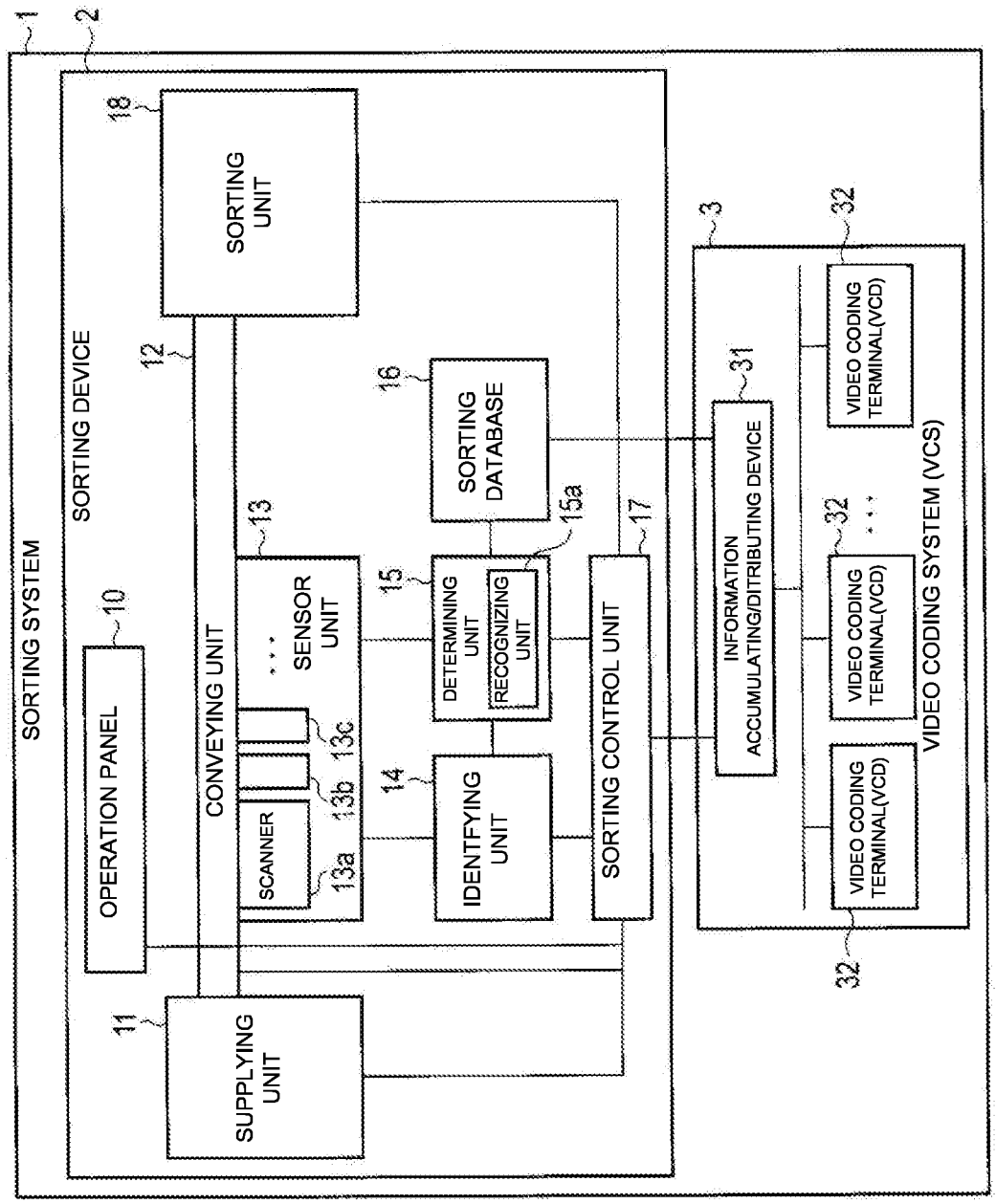
FIG. 1 is a block diagram illustrating an example of a configuration of a sorting system including a sorting device according to an embodiment.

FIG. 1 is a view illustrating a schematic configuration of a sorting system 1 according to the embodiment.

As illustrated in FIG. 1, the sorting system 1 has a sorting device 2 and a video coding system (VCS) 3. The sorting device 2 sorts objects based on sorting information such as address information. Further, the VCS 3 receives an input of sorting information of an object whose sorting information cannot be determined by the sorting device 2, by a coding operation of an operator.

An object to be sorted by the sorting device 2 is an object which can be conveyed and sorted by a conveying mechanism, and an object to which identifiable sorting information is allocated. For example, an object is a paper sheet (e.g. a mail such as a postcard or an envelope), a parcel or an article on which the sorting information is indicated or on which a label with sorting information indicated thereon is attached.

The sorting information to be allocated to an object is expressed as characters, numbers, symbols or barcodes. Characters, numbers, symbols or barcodes to be used for sorting information can be recognized from images obtained by scanning the characters, the numbers, the symbols or the barcodes by a pattern recognition technique. Sorting information to be allocated to an object is, for example, address information including a postal code, an address and a name. Further, sorting information is allocated to a position of an object from which a scanner can read the sorting information. For example, sorting information is indicated on a surface of an object by way of printing or hand-writing. Further, a label with sorting information indicated thereon may be attached to an object.

The sorting device 2 executes sorting processing (sorting processing and a sorting session) of determining a sorting destination corresponding to sorting information while conveying an object, and sorting the object to the determined sorting destination. The sorting device 2 according to the present embodiment has a function of performing first sorting processing and second and subsequent sorting processing. In the first sorting processing, an object whose sorting information is not specified is sorted, i.e., an object is sorted based on sorting information obtained by recognition processing. In the second and subsequent sorting processing, an object whose sorting information can be specified from identification information (ID) is sorted in a state where the sorting information of the object has already been specified. That is, the object is sorted based on the sorting information corresponding to the identification information.

As illustrated in FIG. 1, the sorting device 2 has an operation panel 10, a supplying unit 11, a conveying unit 12, a sensor unit 13, an identifying unit 14, a determining unit 15, a sorting database 16 and a sorting control unit 17.

The operation panel 10 is provided to a front surface of the sorting device 2. The operation panel 10 is configured as a display device in which a touch panel is built. The operation panel 10 displays an operation state of the sorting device 2. The operator can specify a processing mode and start of processing using the operation panel 10. In addition, the processing mode means, for example, first sorting processing or second or subsequent sorting processing.

The supplying unit 11 supplies a processing object to the conveying unit 12. A plurality of objects is set to the supplying unit 11. As described above, sorting information is allocated to each object. The operator sets a plurality of objects to the supplying unit 11, selects a processing mode and commands start of the sorting processing in a state of the selected processing mode. The supplying unit 11 supplies the set objects one by one to the conveying unit 12 at predetermined intervals when the sorting processing starts.

The conveying unit 12 conveys the objects supplied from the supplying unit 11 to the sorting unit 18 through a convey path which leads to the sorting unit 18. The sensor unit 13 is provided on the convey path of the conveying unit 12. The sensor unit 13 is connected with the identifying unit 14 and the determining unit 15. These units are controlled by the sorting control unit 17. The sorting control unit 17 allocates identification information to the objects supplied from the supplying unit 11 to the conveying unit 12.

The conveying unit 12 conveys each object such that each object having passed the sensor unit 13 reaches the sorting unit 18 after processing in the identifying unit 14 and the determining unit 15 is finished. That is, the conveying unit 12 conveys each object such that the identifying unit 14 and the determining unit 15 process each object until each object reaches the sorting unit 18.

The sensor unit 13 has a single or a plurality of physical sensors 13a, 13b, 13c and . . . which detects physical quantities of objects conveyed by the conveying unit 12. For example, the sensor unit 13 has the scanner 13a, the measuring sensor 13b and the quantity sensor 13c as physical sensors. The sorting device 2 according to the present embodiment includes at least the scanner 13a as one physical sensor of the sensor unit 13. The scanner 13a obtains an image of the object conveyed by the conveying unit 12. The scanner 13a is disposed to obtain an image including a region in which sorting information is indicated in the object conveyed by the conveying unit 12. The scanner 13a supplies the obtained object image to the identifying unit 14 and the determining unit 15. An object image is used as a physical quantity for extracting feature values for identifying an object in the identifying unit 14, and is used for processing of recognizing sorting information in the determining unit 15. The measurement sensor 13b measures a size of an object. The quantity sensor 13c measures the weight of an object.

Further, the sensor unit 13 may have a thickness sensor which detects the thicknesses of objects, a sensor which detects a specific property included in an object or a plurality of image sensors which uses light of different wavelength ranges. That is, the sensor unit 13 may include a physical sensor which measures a physical quantity for identifying an object. Various physical sensors matching assumable object shapes or operation modes are provided to the sensor unit 13.

The identifying unit 14 has a feature extracting function, a registering function, a searching function and an abnormality detecting function. The identifying unit 14 functions as the feature extracting function to extract feature values based on information detected from an object by each sensor unit 13. The identifying unit 14 functions as the registering function to associate a value of the feature value of the object extracted by the feature extracting function with identification information (ID) allocated to the object, and register the value of the feature value of the objet and the identification information (ID). Further, the identifying unit 14 functions as the searching function (identifying function) to search for (identify) the identification information (ID) associated with a value of a feature value similar to the value of the feature value based on the value of the feature value of the object extracted by the feature extracting function.

The determining unit 15 specifies sorting information of the object. The determining unit 15 has a recognizing unit 15a which recognizes sorting information from images. The recognizing unit 15a recognizes sorting information of an object by pattern recognition performed on an object image obtained by the scanner 13a. For example, the recognizing unit 15a is configured as a character recognition device (OCR), and recognizes characters indicating sorting information from an image.

The determining unit 15 performs recognition processing of recognizing sorting information from an image by the recognizing unit 15a in sorting processing (e.g. the first sorting processing) performed on an object whose sorting information is not determined (an object which is not registered in the sorting database 16). When sorting information can be specified from an image, the determining unit 15 associates a recognition result of the sorting information with identification information of the object, and registers the recognition result and the identification information in the sorting database 16.

Further, the determining unit 15 supplies coding information including the identification information of the object and the object image, to the VCS 3 when the sorting information cannot be recognized from the image. The VCS 3 associates the sorting information of the object inputted by an operator based on the coding information, with the identification information of the object, and registers the sorting information and the identification information in the sorting database 16.

Further, the determining unit 15 specifies sorting information of the object from the sorting database 16 using as a search key the identification information (ID) of the object specified by the searching function of the identifying unit 14 in sorting processing (e.g. re-sorting processing of the first sorting processing and second and subsequent sorting processing) performed on an object whose sorting information is registered in the sorting database 16 (an object whose recognition result can be obtained or an object whose sorting information is inputted in the VCS 3).

The sorting unit 18 sorts the objects supplied by the conveying unit 12 to each sorting destination under control of the sorting control unit 17. For example, the sorting unit 18 may use a plurality of sorting pockets (not illustrated) partitioned into a plurality of rows and a plurality of columns as sorting destinations. In addition, even when the sorting information is the same, the sorting unit 18 may sort objects to different sorting destinations according to object shapes and sizes.

Sorting information is allocated to each sorting destination of the sorting unit 18. The sorting unit 18 sorts an object to a sorting destination corresponding to sorting information under control of the sorting control unit 17. Further, the sorting unit 18 is provided with a VCS excluding unit (not illustrated) to which an object whose sorting destination cannot be recognized is sorted. Objects accumulated in the VCS excluding unit are supplied again to the supplying unit 11 after sorting information is inputted to the VCS 3. These objects supplied again to the supplying unit 11 are re-sorted based on the sorting information specified from the sorting database 16 using as a search key the identification information (ID) of the objects specified by the searching function of the identifying unit 14.

The sorting control unit 17 allocates identification information (ID) to objects as described above. Identification information (ID) of objects may take arbitrary values as long as the values are unique to all objects. For example, identification information (ID) of objects may take values of numbers allocated to objects according to orders of the objects supplied from the supplying unit 11. The sorting control unit 17 controls processing performed on objects by each unit. The sorting control unit 17 controls conveyance of objects based on a processing status of each unit. The sorting control unit 17 controls sorting of objects based on sorting information of objects given from the determining unit 15 (sorting information based on recognition results or sorting information corresponding to identification information of the objects). For example, the sorting control unit 17 determines a sorting destination corresponding to sorting information determined by the determining unit 15, and controls the sorting unit 18 which conveys and sorts the object to the sorting destination corresponding to the sorting information.

In addition, the identifying unit 14, the determining unit 15 and the sorting control unit 17 are realized by, for example, devices employing the same hardware configuration as that of an electronic computer (computer) including a processor, various memories, programs stored in the memories and various interfaces. That is, each processing performed by the identifying unit 14, the determining unit 15 or the sorting control unit 17 may be a function realized when the processor executes the programs. Further, each of the identifying unit 14, the determining unit 15 and the sorting control unit 17 may be each realized by an electronic computer (computer) including, for example, a processor, a memory and an interface. Furthermore, one electronic computer may realize functions of the identifying unit 14, the determining unit 15 and the sorting control unit 17.

Next, the VCS 3 will be described.

As illustrated in FIG. 1, the VCS 3 has an information accumulating/distributing device 31 and a plurality of video coding terminals (referred to as VCDs below) 32.

The information accumulating/distributing device 31 distributes to each VCD 32 an image of an object whose sorting information cannot be recognized by the sorting device 2, and returns a key entry result of address information of each VCD 32 to the sorting device 2. The information accumulating/distributing device 31 is connected to the sorting device 2. The information accumulating/distributing device 31 is configured as, for example, a personal computer (PC) including a CPU, various memories, programs stored in the memories and various interfaces. The information accumulating/distributing device 31 associates identification information (ID) of an object with an image of the object whose sorting information cannot be recognized by the recognizing unit 15a, and stores the image of the object and the identification information (ID) of the object.

The VCD 32 includes a display (display unit) and a keyboard (operation unit). The VCD 32 is configured as, for example, a personal computer (PC). The VCD 32 displays on the display an object image distributed from the information accumulating/distributing device 31. The VCD 32 receives an input of sorting information such as address information using a keyboard from an operator in a state where the object image is displayed. An input result of the VCD 32 is associated with identification information (ID) of the object, and the input result and the identification information (ID) of the object are returned to the information accumulating/distributing device 31. Further, the information accumulating/distributing device 31 associates the input result from the VCD 32 with the identification information (ID) of the object to register in the sorting database 15 of the sorting device 2. Consequently, sorting information corresponding to identification information (ID) of an object whose sorting information cannot be recognized by the recognizing unit 15a is also registered in the sorting database 16.

Next, a configuration of the identifying unit 14 of the sorting device 2 according to the present embodiment will be described.

Figure 2:
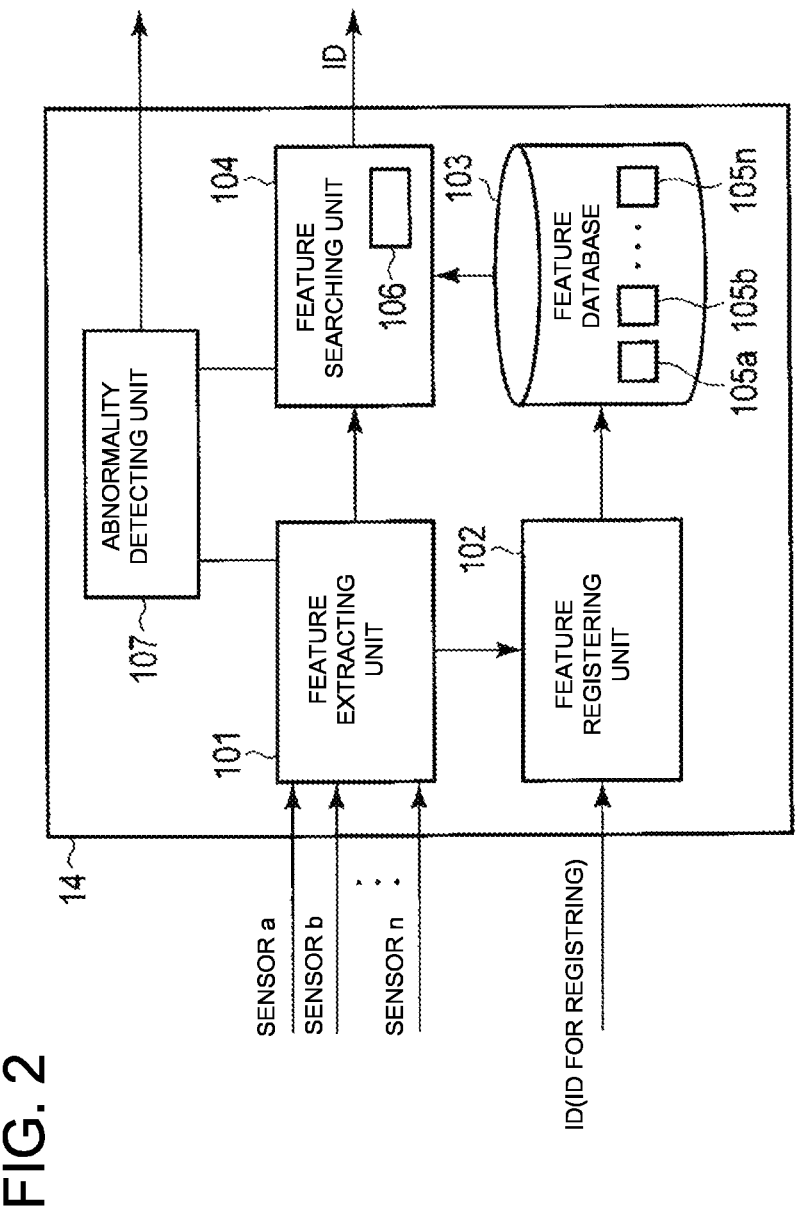
FIG. 2 is a block diagram illustrating an example of a configuration of an identifying unit of the sorting device according to the embodiment.

FIG. 2 is a block diagram illustrating a configuration example of the identifying unit 14 of the sorting device according to the present embodiment.

In the configuration example illustrated in FIG. 2, the identifying unit 14 has a feature extracting unit 101, a feature registering unit 102, a feature database 103, a feature searching unit 104 and an abnormality detecting unit 107. The feature extracting unit 101, the feature registering unit 102 and the feature searching unit 104 may be functions realized when a processor such as a CPU executes programs using a memory such as RAM.

In the first sorting processing (first sorting session), the identifying unit 14 performs registration processing of associating a value of a feature value of each object and identification information (ID) and registering the value and the identification information in the feature database 103 by the feature extracting unit 101 and the feature registering unit 102. Further, in the second and subsequent sorting processing (second and subsequent sorting sessions), the identifying unit 14 performs search processing (identification processing) of specifying identification information of a processing target object based on a value of a feature value of the processing target object by the feature extracting unit 101 and the feature searching unit 104.

In each sorting session, the feature extracting unit 101 extracts from an object a plurality of types of feature values used to identify the object from data detected by each of the physical sensors 13a, 13b, . . . and 13n of the sensor unit 13. As described above, the sensor unit 13 only needs to detect physical quantities of objects, and is configured as a single or a plurality of physical sensors 13a, . . . and 13n. Further, each of the physical sensors 13a, . . . and 13n of the sensor unit 13 may not detect a physical quantity at the same timing as long as it is guaranteed that the physical quantity is obtained from the same object. When, for example, the sensor unit 13 has a function of tracking an object which moves on a convey path, the sensor unit 13 can use detection data at a plurality of time points as data of an object by using the function of the sensor unit 13.

The feature extracting unit 101 obtains data (detection data) detected from one object by each of the physical sensors 13a, 13b, . . . and 13n of the sensor unit 13. The feature extracting unit 101 extracts (calculates) a feature value for identifying the object from the detection data of each of the physical sensors 13a and . . . . The feature extracting unit 101 only needs to extract a feature value for identifying an object, and extracts a type of a feature value which hardly fluctuates under processing conditions per sorting processing. The processing conditions are, for example, conveyance states of an object such as a position and an angle. When, for example, one of the physical sensors of the sensor unit 13 is an image sensor, the feature extracting unit 101 may extract as a feature value a SIFT feature which takes an invariable value with respect to parallel movement and rotation.

The feature extracting unit 101 extracts a predetermined number of types of feature values used for identifying objects. When, for example, N types of feature values are used to identify an object, the feature extracting unit 101 extracts the N types of feature values of each object per sorting processing.

The feature registering unit 102 associates the values of the feature values extracted by the feature extracting unit 101 and the identification information (ID) allocated to the object by the sorting control unit 17, and registers the values of the feature values and the identification information in the feature database 103. The values of the feature values are expressed as a plurality of levels. For example, the number of levels is N from level 0 to level N−1. The feature database 103 includes feature value tables 105 (105a to 105n) per type of a feature value extracted by the feature extracting unit 101. When, for example, the feature extracting unit 101 extracts four types of feature values, the feature database 103 is provided with the four feature value tables 105.

In each feature value table 105, identification information (ID) of an object is associated with a value of a feature value. For example, in each feature value table 105, values of feature values are classified into a plurality of levels (e.g. N levels) according to the number of levels of values of feature values. In each feature value table 105, identification information (ID) of an object is associated with a value of a feature value of an object and is registered. In this feature value table 105, the number of pieces of identification information (ID) of an object which is registered in association with a value of a feature value is not determined at a point of time of design. Therefore, each feature value table 105 has an undefined record. The feature value table 105 only needs to be a table which allows to specify identification information (ID) of an object from a value of a feature value, and may be realized by an arbitrary implementing method. For example, the feature value table 105 may be realized by an implementing method such as dynamic memory allocation or a list structure.

The feature searching unit 104 performs search (identification) processing of searching for (identifying) registered identification information (ID) from the feature database 103, based on the value of the feature value extracted from the object. When performing sorting processing on an object whose values of feature values and identification information (ID) are registered in the feature database 103, the feature searching unit 104 detects the identification information (ID) of the object having values of feature values similar to the values of the feature values extracted by the feature extracting unit 101. The feature searching unit 104 performs identification processing using the vote table 106 in which a predetermined value is voted per each type of a feature value. The identification processing using the vote table will be described in detail below.

The abnormality detecting unit 107 detects abnormality of each of the physical sensors 13a, . . . and 13n and abnormality of an object. That is, when the value of the specific feature value extracted by the feature extracting unit 101 takes an abnormal value, the abnormality detecting unit 107 detects that there is a probability that abnormality occurs in the physical sensor which detected the physical quantity from which the feature value is extracted. When, for example, the value of the feature value exceeds a value of a predetermined normal range or when values of specific feature values of a plurality of continuous objects are the same, the abnormality detecting unit 107 detects that there is a probability that abnormality occurs in the physical sensor corresponding to the feature value.

Further, the abnormality detecting unit 107 detects abnormality of an object or the physical sensor according to a search result of the feature searching unit 104. When, for example, a change in part of values of feature values (a difference between a value of a feature value registered in the feature database and a value of a feature value obtained in the sorting processing) exceeds a predetermined threshold in processing of identifying an object by the feature searching unit 104, the abnormality detecting unit 107 detects that there is a probability that abnormality (physical change) occurs in the object or that abnormality occurs in the physical sensor which detects the physical quantity corresponding to the feature value.

Further, the abnormality detecting unit 107 may output a warning corresponding to content of the detected abnormality.

In addition, when abnormality of a specific physical sensor is detected, the abnormality detecting unit 107 may stop the physical sensor from which abnormality is detected or invalidates the physical quantity detected by the physical sensor whose abnormality is detected.

A processing example of the identifying unit 14 will be described below using a specific example.

As described above, the identifying unit 14 performs registration processing of associating identification information (ID) of an object with values of various feature values to register in the feature database 103 in the first sorting processing. Further, the identifying unit 14 performs search (identification) processing of identifying identification information (ID) of the object from values of various feature values of an object referring to the feature database 103 in the second sorting processing.

First, an example of processing of registering identification information (ID) of an object in the feature database 103 in the first sorting processing will be described.

FIG. 3 illustrates an example of the feature value tables 105 provided in the feature database 103. In the example illustrated in FIG. 3, there are four types of feature values for identifying an object, and the four feature value tables corresponding to the four types of feature values are prepared in the feature database. Further, in each feature value table 105 illustrated in FIG. 3, values of feature values are expressed as eight levels of 0, 1, . . . and 7. The number of these levels is the same as the number of levels of values of feature values. Hence, the values of the feature values of the feature value table 105 take values of feature values extracted by the feature extracting unit 101. Identification information (ID) of an object is registered in a field corresponding to the value of the feature value of the object.

In addition, there may be feature values which are not registered in the feature value table 105 among feature values stored in the feature database 103. In this case, the feature values which are not registered can be used for processing of finally selecting one of a plurality of pieces of identification information when identification information (ID) of a plurality of objects is finally obtained as identification candidates.

In the first sorting processing (sorting session), the feature registering unit 102 initializes each feature value table 105 in which identification information (ID) of a processing target object is registered. For example, the feature registering unit 102 initializes entries of all fields in each feature value table 105 of the feature database 103 to empty entries.

After each feature value table 105 is initialized, the feature registering unit 102 obtains identification information (ID) allocated to an object and values of the feature values of the object. As described above, identification information (ID) is allocated to an object by the sorting control unit 17, and values of feature values of the object are extracted by the feature extracting unit 101.

The feature registering unit 102 registers identification information (ID) of the object in a field corresponding to the value of the feature value of the object per feature value table 105. When, for example, a value of a Kth feature value extracted from the object is Vk, the feature registering unit 102 registers (adds) identification information (ID) of the object in a field corresponding to the value Vk of the feature value of the feature value table corresponding to the Kth feature value. The feature registering unit 102 registers identification information (ID) of all objects and all feature values in each feature value table. In this regard, there may be feature values which are not registered in the feature value table.

FIG. 3 illustrates an example of four feature value tables 105U1 to 105U4 in which identification information (ID) of an object is registered in the first sorting session.

In FIG. 3, identification information (ID) of an object is registered in association with each value of a feature value U1 in the feature value table 105U1. Similarly, identification information (ID) of each object is registered in association with each value of feature values U2, U3 and U4 in each of the feature value tables 105U2, 105U3 and 105U4. Values of feature values of each object can be referred from the feature value tables illustrated in FIG. 3.

Next, an operation of the feature searching unit 104 will be described.

The feature searching unit 104 searches for (identifies) identification information (ID) of an object based on values of feature values extracted from detection data of an object referring to the feature database 103. The feature searching unit 104 prepares the vote table 106 per search target object. The feature searching unit 104 initializes the vote table 106 every time processing of finding identification information (ID) of each object starts in the second sorting processing (sorting session).

In the second sorting processing, the feature searching unit 104 obtains the feature values extracted by the feature extracting unit based on detection data detected from the object by each sensor of the sensor 13. For example, a value of the extracted kth feature value is Uk. In this case, the feature searching unit 104 selects identification information (ID) of an object registered in a field corresponding to a value Uk±j (j=0, 1, . . . m, 0≤K+j≤Dk) in the kth feature value table 105Uk. The feature searching unit 104 updates a value in a field of a vote count corresponding to identification information (ID) of an object selected in the vote table 106, to a value obtained by adding to the value a value (M[j]) determined in advance according to j as a vote on the vote table 106.

Meanwhile, m is a predetermined integer constant which is not negative. In this regard, in a case of m=0, a vote is given only on identification information (ID) of an object corresponding to Uk. However, even feature values which are obtained from the same object fluctuate more or less depending on various conditions. Hence, votes are also given on identification information (ID) of objects corresponding to a plurality of previous and subsequent values to deal with such a fluctuation. Hence, an integer value greater than 0 is set to a value of m. Further, M[j] is normally maximum in a case of j=0, and is set to such a weighted value which monotonically decreases in a broad sense as j increases. This M[j] corresponds to a blur mask, and plays a key role to deal with a fluctuation of feature values.

The feature searching unit 104 determines identification information (ID) of the object based on a voting result on a plurality of types of feature values of the object after voting on a plurality of types of feature values of the object. The feature searching unit 104 finds identification information (ID) of an object whose voted value is maximum in the voting result. The feature searching unit 104 outputs identification information (ID) of the object whose vote count is maximum as a search (identification) result of the identification information (ID) of the processing target object.

Voting on a plurality of types of feature values of an object in the vote table 106 will be described below.

FIGS. 4, 5, 6 and 7 illustrate examples of voting on the vote table 106 based on a plurality of types of feature values of a given object. In the examples in FIGS. 4, 5, 6 and 7, m=1, M[0]=2 and M[1]=1 hold. Further, in the examples in FIGS. 4, 5, 6 and 7, a vote is given on the vote table 106 based on a value of a feature value extracted in the second sorting session referring to the feature value table in a state illustrated in FIG. 3.

Figure 4:
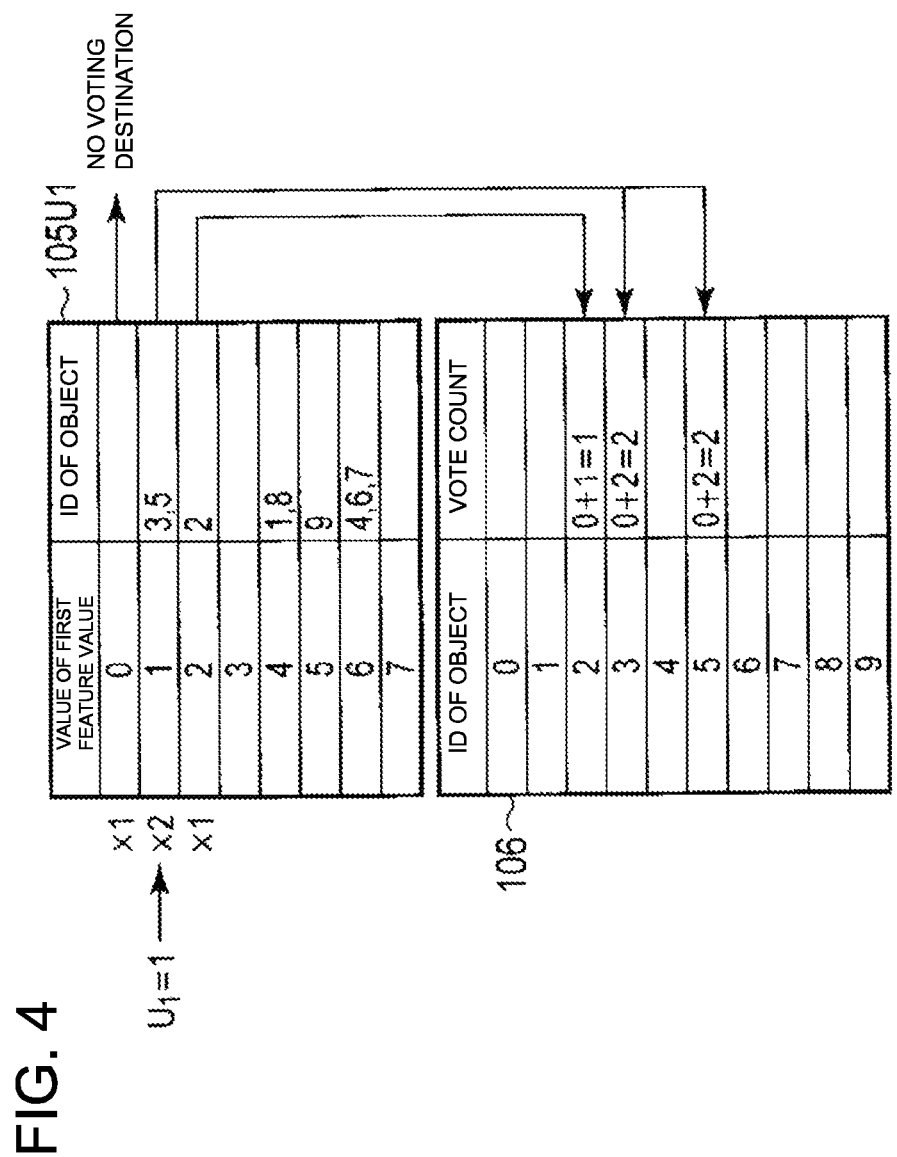
FIG. 4 is a view illustrating an example of voting on a vote table using a first feature value table of the identifying unit of the sorting device according to the embodiment.

FIG. 4 illustrates an example of voting on the vote table 106 when a value of a first feature value of a given object is U1 (=1).

In the example illustrated in FIG. 4, the feature searching unit 104 extracts identification information (ID) of an object registered in a field corresponding to a value U1±j (j=0, 1, 0<U1±j≤7) of the first feature value in the first feature value table 105U1. Further, the feature searching unit 104 increases the value of a vote count in the field of identification information (ID) of the object extracted in the vote table 106 by M[0] or M[1] according to the feature values. For example, M[0]=2 and M[1]=1 hold. The values of M[0] and M[1] mean values voted according to feature values.

In addition, the values of M[0] and M[1] (values to be voted) are values which reflect a weight on the vote, and may be set to arbitrary values according to the property of each feature value. Further, a vote range may also be set according to the feature value.

First, the feature searching unit 104 refers to the field corresponding to a value "1 (=1(U1)+0)" of the first feature value in the first feature value table 105U1 assuming j=0. In the example illustrated in FIG. 4, "3" and "5" are registered as identification information (ID) of an object in the field corresponding to the value "1" of the first feature value. By this means, the feature searching unit 104 increases values of vote counts in a field corresponding to identification information (ID) "3" of the object and in a field corresponding to identification information (ID) "5" of the object in the vote table 106 by M[0] (=2), respectively. In a case of the example illustrated in FIG. 4, an initial value of a vote count in each field is 0. Therefore, the feature searching unit 104 votes "2" in the field corresponding to identification information (ID) "3" of the object and in the field corresponding to identification information (ID) "5" of the object in the vote table 106, and updates the values of the vote counts in the fields of "3" and "5" to "2 (=0+2)".

Further, the feature searching unit 104 refers to a field corresponding to a value "0(=1(U1)−1)" of the first feature value in the first feature value table 105U1 assuming j=−1. In the example illustrated in FIG. 4, identification information (ID) of an object is not registered in a field corresponding to a value "0" of the first feature value in the first feature value table 105U1. Hence, the feature searching unit 104 determines that there is no voting destination for a value "0" of the first feature value.

Further, the feature searching unit 104 refers to a field corresponding to a value "2(=1(U1)+1)" of the first feature value in the first feature value table 105U1 assuming j=+1. "2" is registered as identification information (ID) of an object in the field corresponding to a value "2" of the first feature value in the first feature value table 105U1. Hence, the feature searching unit 104 increases a value of a vote count in the field corresponding to identification information (ID) "2" of the object in the vote table 106 by M[1] (=1). As a result, the feature searching unit 104 votes "1" in the field corresponding to the identification information (ID) "2" of the object in the vote table 106, and updates the value of the vote count to "1 (=0+1)".

When voting on the vote table 106 based on the first feature value U1 is finished, the feature searching unit 104 votes on the vote table 106 based on the second feature value.

Figure 5:
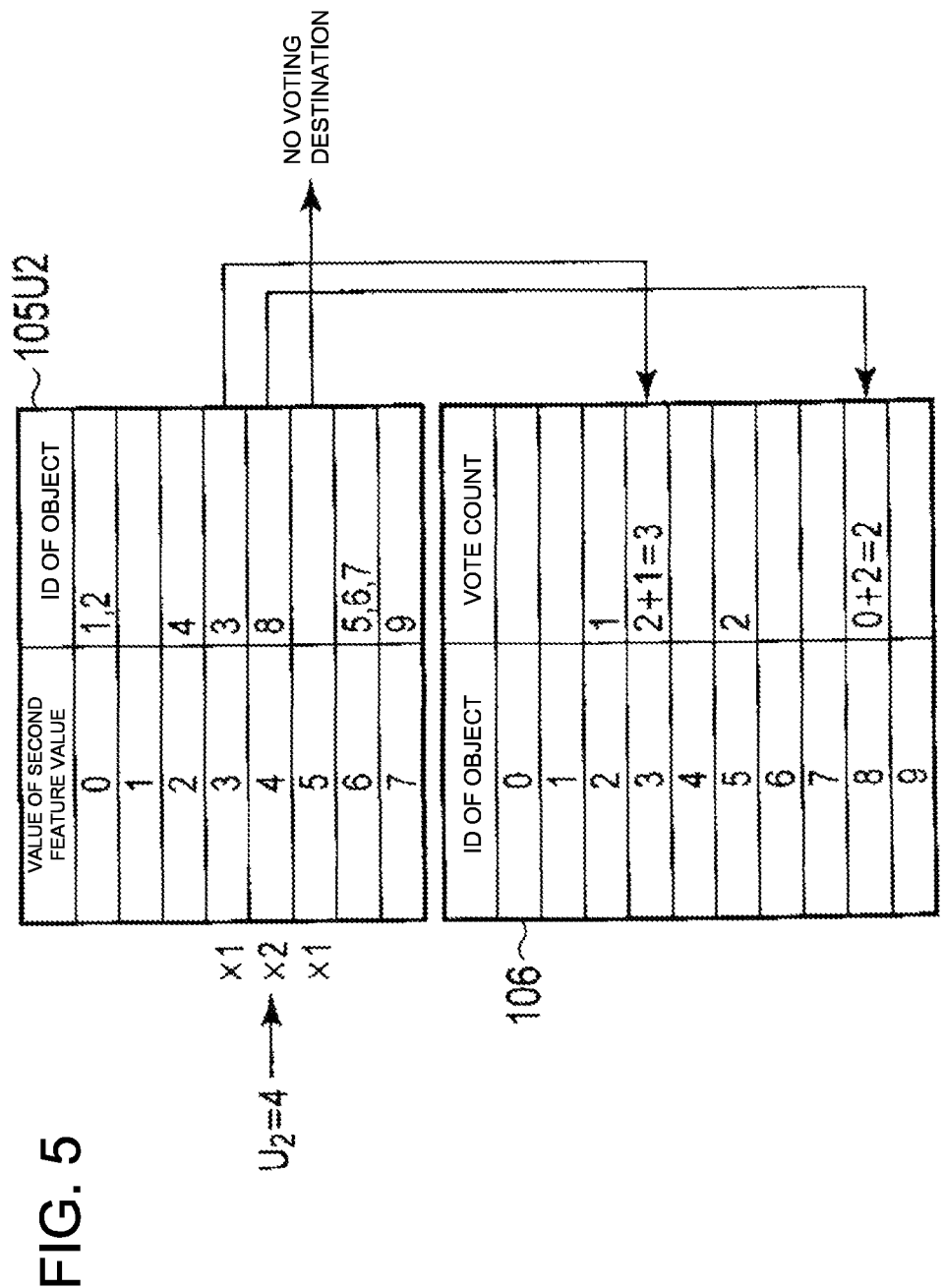
FIG. 5 is a view illustrating an example of voting on the vote table using a second feature value table of the identifying unit of the sorting device according to the embodiment.

FIG. 5 illustrates an example of voting on the vote table 106 after the voting illustrated in FIG. 4 when the value of the second feature value is U2 (=4).

In the example illustrated in FIG. 5, the feature searching unit 104 extracts identification information (ID) of objects registered in fields corresponding to values U2±j (j=0, 1, 0≤U2±j≤7) of the second feature value in the second feature value table 105U2. Further, the feature searching unit 104 increases the value of the vote count in the field corresponding to identification information (ID) of the object extracted in the vote table 106 by M[0] (=2) or M[1] (=1).

First, the feature searching unit 104 refers to a field corresponding to a value "4(=4(U2)+0" of the second feature value in the second feature value table 105U2 assuming j=0. In the example illustrated in FIG. 5, "8" is registered as identification information (ID) of the object in the field corresponding to the value "4" of the second feature value. Consequently, the feature searching unit 104 increases the value of the vote count in the field corresponding to identification information (ID) "8" of the object in the vote table 106 by M[0] (=2). In a case of the example illustrated in FIG. 5, the value of the vote count in the field corresponding to the identification information (ID) "8" of the object in the vote table 106 before voting is "0". The feature searching unit 104 votes "2" in the field corresponding to the identification information (ID) "8" of the object, and updates the value of the vote count to "2 (=0+2)".

Further, the feature searching unit 104 refers to the field corresponding to a value "3 (=4(U2)−1)" of the second feature value in the second feature value table 105U2 assuming j=−1. In the example illustrated in FIG. 5, "3" is registered as identification information (ID) of the object in the field corresponding to a value "3" of the second feature value in the second feature value table 105U2. Hence, the feature searching unit 104 increases the value of the vote count in the field corresponding to the identification information (ID) "3" of the object in the vote table 106 by M[1] (=1). In the example illustrated in FIG. 5, the value of the vote count in the field corresponding to the identification information (ID) "3" of the object in the vote table 106 before voting is "2". The feature searching unit 104 votes "1" in the field corresponding to the identification information (ID) "3" of the object, and updates the value of the vote count to "3 (=2+1)".

Further, the feature searching unit 104 refers to a field corresponding to a value "5(=4(U2)+1)" of the second feature value in the second feature value table 105U2 assuming j=+1.

In the example illustrated in FIG. 5, identification information (ID) of the object is not registered in the field corresponding to the value "5" of the second feature value in the second feature value table 105U2. Hence, the feature searching unit 104 determines that there is no voting destination for the value "5" of the second feature value.

When voting on the vote table 106 based on the second feature value U2 is finished, the feature searching unit 104 votes on the vote table 106 based on the third feature value.

Figure 6:
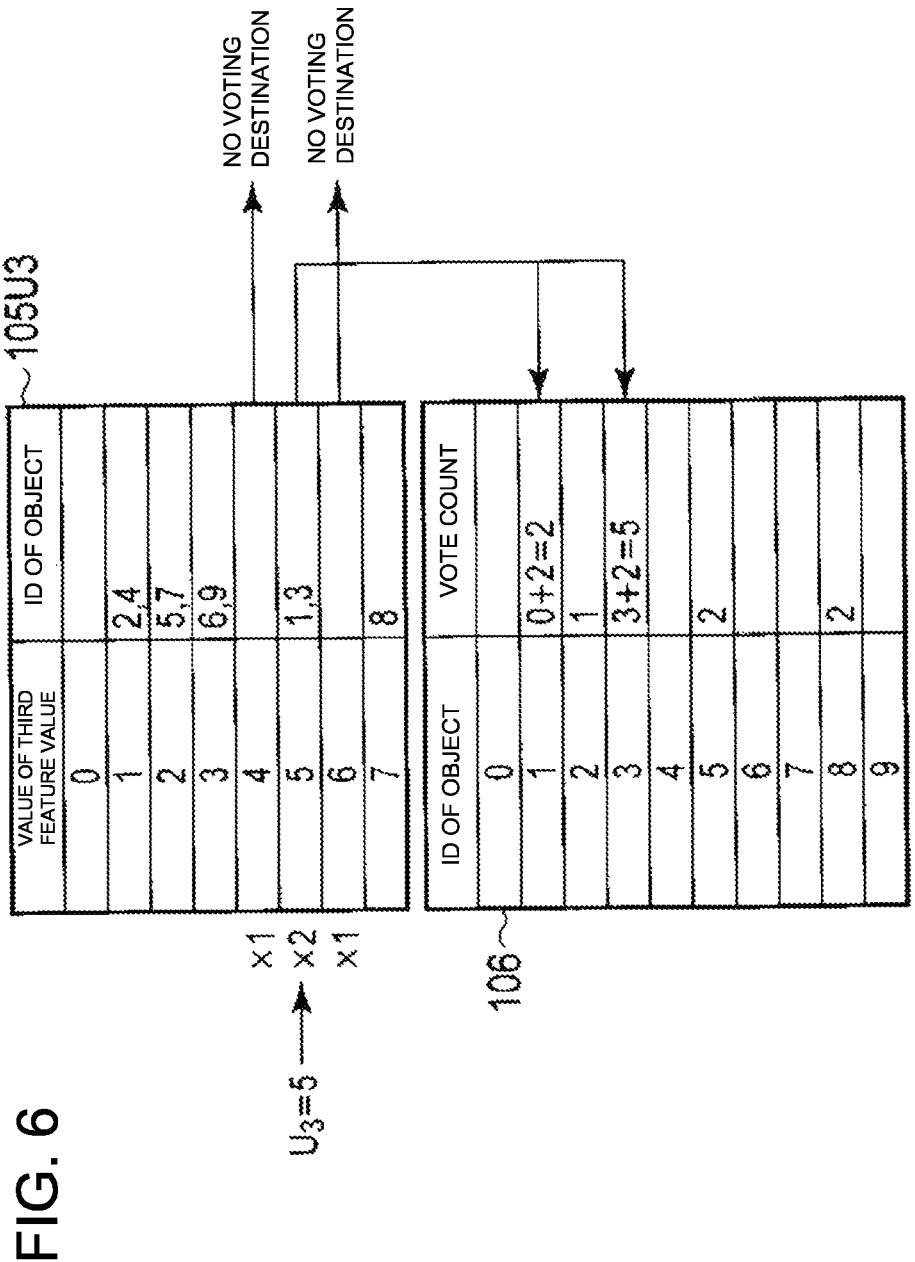
FIG. 6 is a view illustrating an example of voting on the vote table using a third feature value table of the identifying unit of the sorting device according to the embodiment.

FIG. 6 illustrates an example of voting on the vote table 106 after the voting illustrated in FIG. 5 when the value of the third feature is U3 (=5).

In the example illustrated in FIG. 6, the feature searching unit 104 extracts identification information (ID) of objects registered in fields corresponding to values U3±j (j=0, 1, 0≤U3±j≤7) of the third feature value in the third feature value table 105U3. Further, the feature searching unit 104 increases a value of a vote count in the field corresponding to the identification information (ID) of the objects extracted in the vote table 106 by M[0] (=2) and M[1] (=1).

First, the feature searching unit 104 refers to the field corresponding to a value "5 (=5 (a value of U3)+0)" of the third feature value in the third feature value table 105U3 assuming j=0. In the example illustrated in FIG. 6, "1" and "3" are registered as identification information (ID) of an object in the field corresponding to the value "5" of the third feature value. By this means, the feature searching unit 104 increases values of vote counts in the field corresponding to the identification information (ID) "1" of the object and in the field corresponding to the identification information (ID) "3" of the object in the vote table 106 by M[0](=2). In a case of an example illustrated in FIG. 6, the value of the vote count in the field corresponding to the identification information (ID) "1" of the object in the vote table 106 before voting is "0", and the value of the vote count in the field corresponding to the identification information (ID) "3" of the object is "3". The feature searching unit 104 votes "2" in the field corresponding to the identification information (ID) "1" of the object and updates the value of the vote count to "2 (=0+2)", and votes "2" in the field corresponding to the identification information (ID) "3" of the object and updates the value of the vote count to "5 (=3+2)".

Further, the feature searching unit 104 refers to the field corresponding to a value "4 (=5(U3)−1)" of the third feature value in the third feature value table 105U3 assuming j=−1. Further, the feature searching unit 104 refers to a field of the identification information (ID) of the object corresponding to a value "6 (=5(U3)+1)" of the third feature value in the third feature value table 105U3 assuming j=+1. In the example illustrated in FIG. 6, identification information (ID) of objects is not registered in a field corresponding to the value "4" of the third feature value and in the field corresponding to the value "6" of the third feature value in the third feature value table 105U3. Hence, the feature searching unit 104 determines that there is no voting destination for the value "4" of the third feature value and the value "6" of the third feature value.

When voting on the vote table 106 based on the third feature value is finished, the feature searching unit 104 votes on the vote table 106 based on the fourth feature value.

Figure 7:
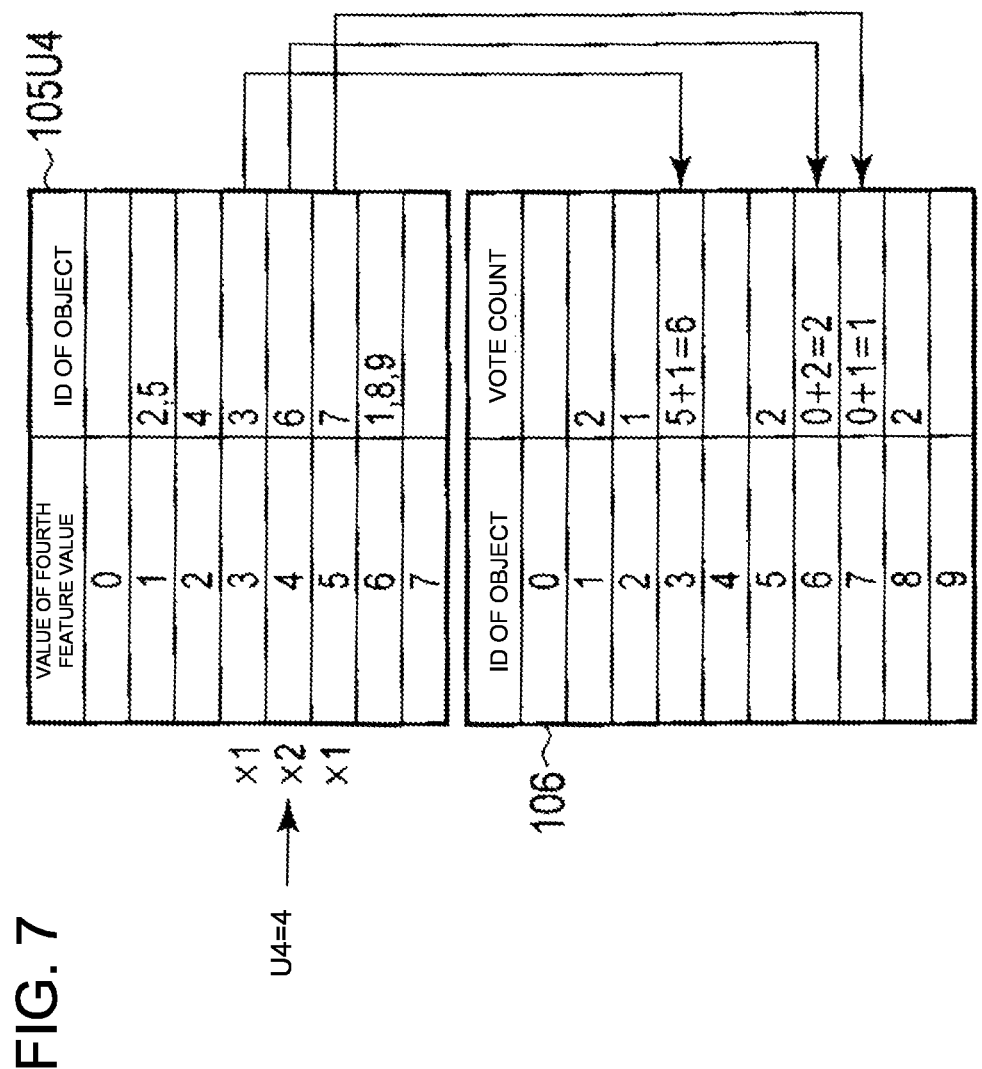
FIG. 7 is a view illustrating an example of voting on the vote table using a fourth feature value table of the identifying unit of the sorting device according to the embodiment.

FIG. 7 is a view illustrating an example of voting on the vote table 106 after the voting illustrated in FIG. 6 when the value of the fourth feature value is U4 (=4).

In the example illustrated in FIG. 7, the feature searching unit 104 increases values in the vote table 106 by M[0]=2 and M[1]=1 for identification information (ID) of objects registered in fields corresponding to values U4±j (j=0, 1, 0≤U4±j≤7) of the fourth feature value in the fourth feature value table 105U4.

First, the feature searching unit 104 refers to the field corresponding to a value "4 (=4(U4)+0)" of the fourth feature value in the fourth feature value table 105U4 assuming j=0. In the example illustrated in FIG. 7, "6" is registered as identification information (ID) of the object in the field corresponding to the value "4" of the fourth feature value of the fourth feature value table 105U4. Consequently, the feature searching unit 104 increases the value of the vote count in the field corresponding to the identification information (ID) "6" of the object in the vote table 106 by M[0] (=2). In a case of the example illustrated in FIG. 7, the field corresponding to the identification information (ID) "4" of the object in the vote table 106 before voting is "0". The feature searching unit 104 votes "2" in the field corresponding to the identification information (ID) "4" of the object in the vote table 106, and updates the value of the vote count to "2 (=0+2)".

Further, the feature searching unit 104 refers to the field corresponding to a value "3 (=4(U4)−1)" of the fourth feature value in the fourth feature value table 105U4 assuming j=−1. In the example illustrated in FIG. 7, "3" is registered as an ID of the object in the field corresponding to the value "3" of the fourth feature value in the fourth feature value table 105U4. Consequently, the feature searching unit 104 increases the value of the vote count in the field corresponding to the identification information (ID) "3" of the object in the vote table 106 by M[1] (=1). In the example illustrated in FIG. 7, the field corresponding to the identification information (ID) "3" of the object in the vote table 106 before voting is "5". The feature searching unit 104 votes "1" in the field corresponding to the identification information (ID) "3" of the object in the vote table 106, and updates the value of the vote count to "6 (=5+1)".

Further, the feature searching unit 104 refers to the field corresponding to a value "5 (=4(U4)+1)" of the fourth feature value in the fourth feature value table 105U4 assuming j=+1. Furthermore, in the example illustrated in FIG. 7, "7" is registered as identification information (ID) of the object in the field corresponding to the value "5" of the fourth feature value. Hence, the feature searching unit 104 increases the value of the vote count in the field corresponding to the identification information (ID) "7" of the object in the vote table 106 by M[1] (=1). In the example illustrated in FIG. 7, the value of the vote count in the field corresponding to the identification information (ID) "7" of the object in the vote table 106 before voting is "0". The feature searching unit 104 votes "1" in the field corresponding to the identification information (ID) "7" of the object in the vote table 106, and updates the value of the vote count to "1 (=0+1)".

Next, identifying an object based on a result of voting on the vote table 106 will be described.

When voting on the vote table 106 for one object based on a plurality of types of feature values is finished, the feature searching unit 104 identifies identification information (ID) of the object based on the result of voting on the vote table 106, and determines the identification information (ID) of the object.

FIG. 8 illustrates an example of the vote table 106 illustrating a final voting result. FIG. 8 illustrates the voting result obtained by voting processing illustrated in FIGS. 4, 5, 6 and 7.

When a maximum value of the vote count in the vote table 106 is not less than a predetermined reference value, the feature searching unit 104 obtains identification information (ID) of an object whose vote count is maximum as an identification result based on the voting result. That is, in the vote table 106 illustrated in FIG. 8, the maximum vote count (vote value) is "6", and the identification information (ID) of the object whose vote count is maximum is "3". In this regard, when the vote count "6" is not less than a predetermined reference value, the feature searching unit 104 determines that the identification information (ID) of the object is "3" as the identification result, based on the voting result illustrated in FIG. 8.

Further, the feature searching unit 104 may verify the identification result based on the voting result. When, for example, the identification information (ID) of the object is "3" as the identification result based on the voting result, the feature searching unit 104 compares each feature value obtained in the first sorting processing and each feature value obtained in second and subsequent sorting processing for the object whose identification information (ID) obtained from the voting result is "3". The feature searching unit 104 determines whether or not a difference (change) between values of corresponding feature values as a limit (an allowable value of a fluctuation) of a fluctuation value caused by various fluctuations upon detection performed by each of the sensors 13*a*, . . . and 13*n* is within a threshold set in advance.

When every feature value has the difference between a value of a feature value obtained in the first sorting processing and a value of a feature value obtained in the second sorting processing which is within the above threshold, the feature searching unit 104 determines as the identification result an ID ("3" in the above example) of the object obtained as the identification information based on the voting result.

Meanwhile, when one of the feature values has a difference between the value of the feature value obtained in the first sorting processing and the value of the feature value obtained in the second sorting processing which exceeds the above threshold, the feature searching unit 104 determines that some changes occur in the object or the physical sensor between the first sorting processing and the second sorting processing. When a value of a given feature value changes not less than the threshold, the feature searching unit 104 may output that there is a change in the object or a change such as failure of the physical sensor.

Further, when part of values of feature values change not less than the threshold, the feature searching unit 104 may output an identification result (the identification information (ID) "3" in the above example) based on a voting result, or may output that an identification result is not determined. For example, the feature searching unit 104 may output an identification result based on a voting result when the number of feature values which change not less than the threshold is less than a predetermined number, and may output that the identification result is not determined when specific feature values change not less than the threshold.

Further, as to a change in the value of each feature value, an assumable change and a cause of the change may be classified and stored in a storage unit according to types of a physical sensor and a feature value. When, for example, the weight significantly decreases (decreases not less than the threshold), drop of content is assumed as a cause. Further, when an external shape dimension greatly changes (changes not less that the threshold), a damage on an object is assumed as a cause. Matters assumed as causes of these changes may be outputted together with a notification that feature values change not less than the threshold.

Further, when a value of a feature value changes not less than the threshold, the feature searching unit 104 may issue a warning about failure of a physical sensor corresponding to the feature value. Furthermore, when it is detected that values of specific feature values of a plurality of objects change not less than the threshold, the feature searching unit 104 may warn failure of the physical sensor corresponding to the feature values.

Still further, the value of processing required for search (identification) using the above voting includes voting of the number of times obtained by multiplying the number of types of feature values with (2 m+1), and processing of scanning all IDs of objects once to find a maximum value in the vote table. The value of these processing is much less than the value of processing of matching the maximum number of pieces of identification information (ID) of an object×the number of types of feature values×the number of levels of values of the feature values.

In addition, the maximum value in the vote table can be found by scanning all values in the vote table once. However, the number of types of feature values is assumed to be less than the number of objects and, consequently, the maximum value can be found by adding processing of updating the maximum value per vote. In this case, processing proportional to the maximum number of pieces of identification information (ID) of an object does not need to be performed.

Further, the vote table is initialized per processing of identifying identification information (ID) of each object. Processing of initializing the vote table per identification processing requires a processing value proportional to the maximum number of pieces of identification information (ID) of objects. Hence, a column of "a session ID used upon updating the column last" is added to the vote table, and is initialized only once when a machine is activated. At a next time, instead of initializing all items of data, a different session ID may be generated every time, "a session ID used upon last update" may be checked when the vote table is updated, a vote value of a column may be initialized when the session ID is older than a session ID which is currently processed, and then "the session ID used upon the last update" may be updated. Consequently, a processing value proportional to the maximum number of IDs of objects is not required to initialize the vote table per identification processing and, consequently, processing becomes faster as a whole.

Further, the above value of m and the value of M[I] for setting the number of times of voting and a vote value may also be set to different values taking into account to what degree the values fluctuate per type of a feature value every time each physical sensor detects the values.

Next, the first sorting processing in the sorting device 2 will be described.

Figure 9:
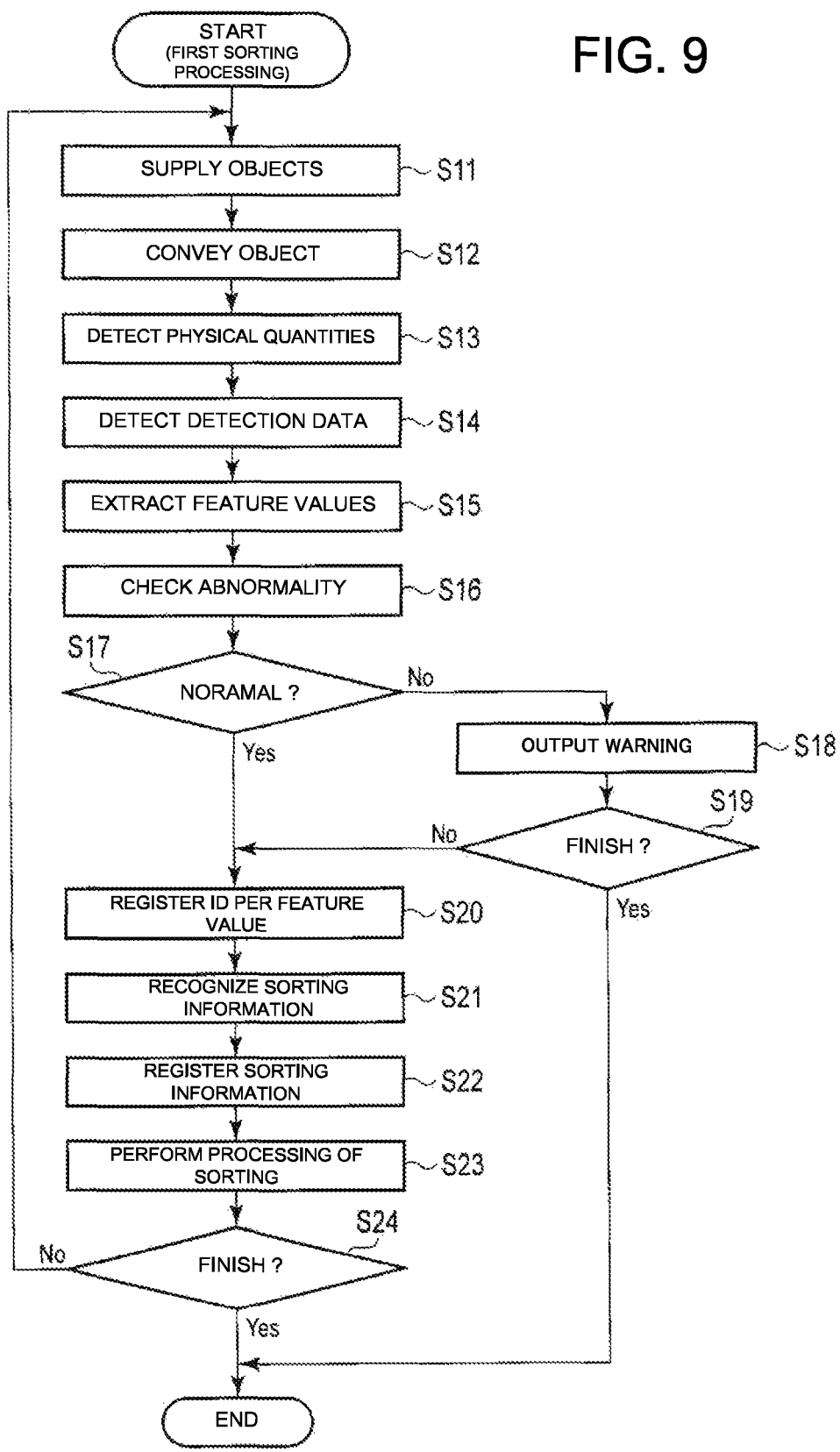
FIG. 9 is a flowchart for explaining an example of first sorting processing in the sorting device according to the embodiment.

FIG. 9 is a flowchart for explaining an example of the first sorting processing in the sorting device 2.

First, the operator sets objects for the first sorting processing, to the supplying unit 11. Next, the operator selects the first sorting processing as the processing mode, and commands the operation panel 10 to start the sorting processing in a state where the first sorting processing is selected. When start of the first sorting processing is commanded, the supplying unit 11 supplies the set objects one by one to the conveying unit 12 at predetermined intervals (step S11). The conveying unit 12 conveys the objects supplied from the supplying unit 11, on the convey path (step S12). Further, the sorting control unit 17 issues identification information (ID) to the object supplied from the supplying unit 11 and conveyed to the conveying unit 12, and notifies the identification information (ID) to each unit. Furthermore, the sorting control unit 17 continuously monitors (tracks) conveyance states of the object conveyed by the conveying unit 12.

When the conveying unit 12 conveys the object, each physical sensor (the scanner 13*a* and the physical sensors 13*b*, 13*c* and . . . ) of the sensor unit 13 detects various physical quantities from the object conveyed by the conveying unit 12 (step S13). Each physical sensor 13*a* and . . . of the sensor unit 13 supplies data (detection data) detected from the object to the identifying unit 14. Thus, the identifying unit 14 obtains various items of detection data detected from the object by each physical sensor 13*a* and . . . (step S14).

In addition, the conveyance state of each object is monitored. Hence, the various items of detection data which are data detected at different positions or different timings by each physical sensor 13*a* and . . . and which are detected from one object are supplied to the identifying unit 14 as detection data detected from one object.

When obtaining the various items of detection data of the object, the identifying unit 14 extracts various feature values used to identify the object from the obtained detection data (step S15). When, for example, the identifying unit 14 identifies the object based on the N types of feature values, the feature extracting unit 101 of the identifying unit 14 extracts the N types of feature values from the obtained detection data. When the feature extracting unit 101 extracts the various feature values, the abnormality detecting unit 107 checks whether or not values of the extracted feature values take abnormal values to check whether or not there is abnormality (failure) in each physical sensor 13*a* and . . . (step S16).

When the abnormality detecting unit 107 determines that there is abnormality in one of the physical sensors 13*a* and . . . (step S17, NO), the abnormality detecting unit 107 outputs a warning indicating abnormality content (step S18). For example, the abnormality detecting unit 107 associates and holds types of feature values and abnormality contents predicted when values of the feature values take abnormal values, and outputs a warning indicating abnormality content predicted according to the type of the feature value whose value is determined to be abnormal. Further, when the abnormality detecting unit 107 determines that there is abnormality in one of the physical sensors 13, the abnormality detecting unit 107 or the feature registering unit 102 determines whether or not it is possible to continue registration processing according to the abnormality content (step S19). When it is determined that it is not possible to continue the registration processing (step S19, YES), the identifying unit 14 finishes the registration processing.

When it is determined that there is no abnormality in each physical sensor 13*a* and . . . (step S17, YES), the feature extracting unit 101 supplies the various feature values extracted from the object, to the feature registering unit 102. Further, when it is determined that it is possible to continue the registration processing after it is determined that there is abnormality in one of the physical sensors 13*a* and . . . (step S19, NO), the feature extracting unit 101 supplies the various feature values extracted from the object, to the feature registering unit 102. In this case, the feature registering unit 102 may obtain feature values extracted from a physical quantity other than a physical quantity detected by a physical sensor whose abnormality is determined.

Further, the feature registering unit 102 obtains the various feature values of the object from the feature extracting unit 101, and obtains identification information (ID) of the object issued by the sorting control unit 17. When obtaining the various feature values extracted from the object and the identification information (ID), the feature registering unit 102 registers the identification information (ID) of the object in a field corresponding to a value of the feature value of the object in each feature value table 105 corresponding to the various feature values (step 20).

Further, the determining unit 15 receives a supply of an image read from the object by the scanner 13a. When receiving a supply of the image read from the object by the scanner 13a, the determining unit 15 performs processing of recognizing sorting information of the object based on the obtained read image by the recognizing unit 15a (step S21). Further, the determining unit 15 also receives a notification of the identification information (ID) of the object. By this means, the determining unit 15 associates and manages the image of the object read by the scanner 13a and the identification information (ID) of the object.

When obtaining a recognition result of the image read from the object by the recognizing unit 15a, the determining unit 15 associates the recognition result and the identification information and registers the recognition result and the identification information in the sorting database 16 (step S22). When, for example, the recognizing unit 15a can recognize the sorting information from the image read from the object, the determining unit 15 associates the sorting information obtained as the recognition result with the identification information (ID) of the object to register in the sorting database 16. Further, when the recognizing unit 15a cannot recognize the sorting information from the image read from the object, the determining unit 15 associates the recognition result that the sorting information cannot be recognized (or processing performed by the VCS) with the identification information (ID) of the object to register in the sorting database 16. The determining unit 15 associates the image read from the object whose sorting information cannot be recognized, with identification information (ID), creates coding information and supplies the coding information to the VCS 3. The VCS 3 associates the sorting information inputted by the operator using the video coding terminal VCD with the identification information (ID), and registers the sorting information and the identification information (ID) in the sorting database 16.

When obtaining the recognition result of the recognizing unit 15a, the determining unit 15 notifies the recognition result to the sorting control unit 17. The sorting control unit 17 controls the sorting unit 18 such that the object can be sorted to a sorting destination based on the sorting information according to the recognition result of the sorting information from the determining unit 15 (step S23). The sorting device 2 executes processing in above steps S11 to S24 with respect to each object until the first sorting processing with respect to objects is finished or there is no more object.

According to the above processing, in the first sorting processing performed with respect to objects, the sorting device 2 associates and registers values of various feature values extracted from the physical quantity of an object detected by each physical sensor, and the identification information (ID) of the object in the feature data base. Further, the sorting device 2 associates the recognition result of the sorting information of the object with the identification information (ID) to register in the sorting database. Consequently, in the first sorting processing, the sorting device 2 can sort each object according to a recognition result of sorting information, and hold information which allows identification information (ID) of the object to be referred to based on values of various feature values extracted from the physical quantity detected by each physical sensor.

Next, the second sorting processing in the sorting device 2 will be described.

Figure 10:
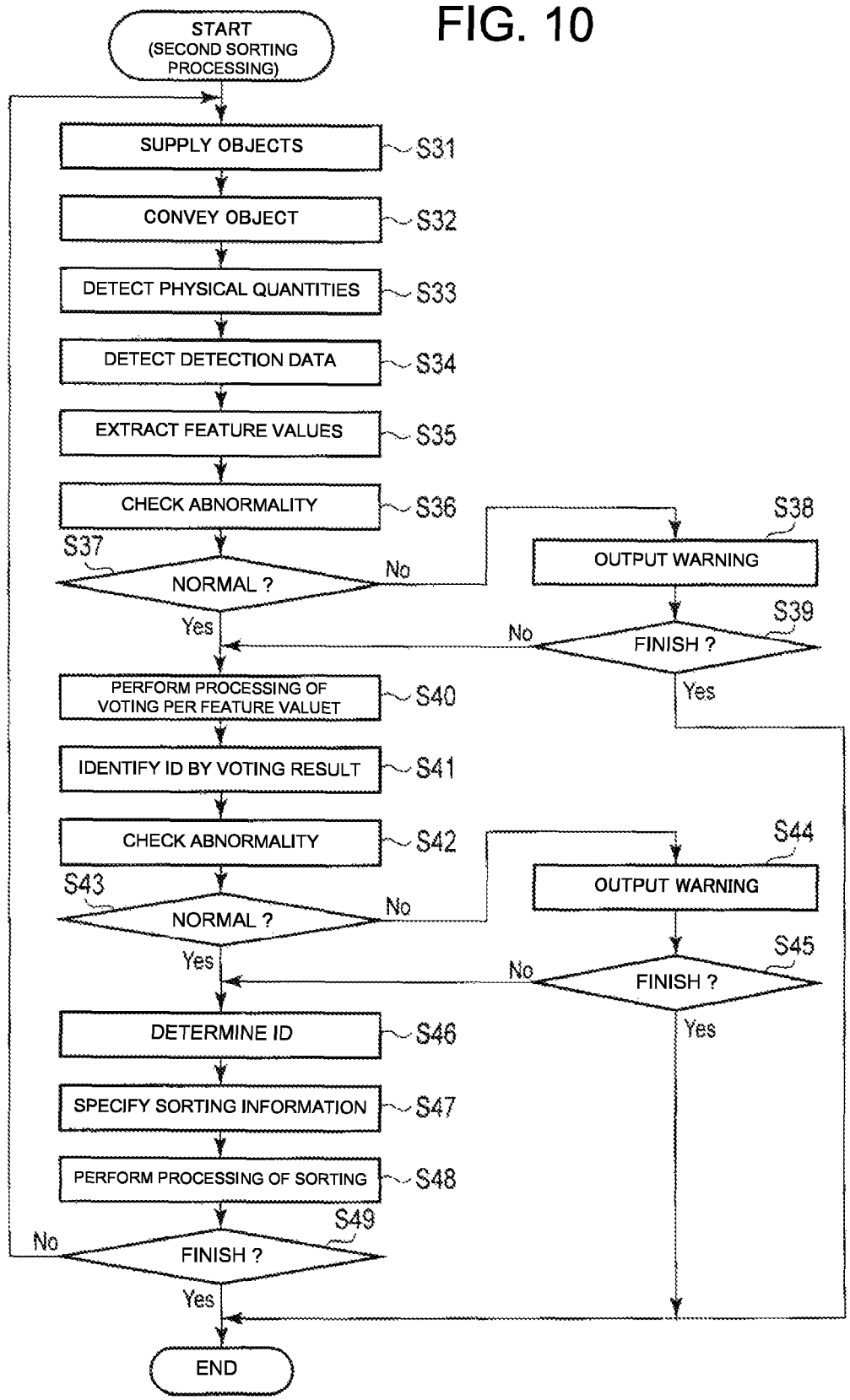
FIG. 10 is a flowchart for explaining an example of second sorting processing in the sorting device according to the embodiment.

FIG. 10 is a flowchart for explaining an example of the second sorting processing in the sorting device 2.

First, the operator sets objects for the second sorting processing, to the supplying unit 11. Next, the operator selects the second sorting processing as the processing mode, and commands the operation panel 10 to start the sorting processing in a state where the second sorting processing is selected. When start of the second sorting processing is commanded, the supplying unit 11 supplies the set objects one by one to the conveying unit 12 at predetermined intervals (step S31). The conveying unit 12 conveys the objects supplied from the supplying unit 11, on the convey path (step S32). In addition, the sorting control unit 17 continuously monitors (tracks) conveyance states of the object supplied from the supplying unit 11 and conveyed by the conveying unit 12.

When the conveying unit 12 conveys the object, each physical sensor (the scanner 13a and the physical sensors 13b, 13c and . . . ) of the sensor unit 13 detects various physical quantities from the object conveyed by the conveying unit 12 (step S33). Each physical sensor 13a and . . . of the sensor unit 13 supplies data (detection data) detected from the object to the identifying unit 14. Thus, the identifying unit 14 obtains various items of detection data detected from the object by each physical sensor 13a and . . . (step S34).

In addition, the conveyance states of each object are monitored. Hence, the various items of detection data which are data detected at different positions or different timings by each physical sensor 13a and . . . and which are detected from one object are supplied to the identifying unit 14 as data detected from one object.

When obtaining the various items of detection data of one object, the identifying unit 14 extracts various feature values used to identify the object from the obtained detection data (step S35). When, for example, the identifying unit 14 identifies the object based on the N types of feature values, the feature extracting unit 101 of the identifying unit 14 extracts the N types of feature values from the obtained detection data. When the feature extracting unit 101 extracts the various feature values, the abnormality detecting unit 107 checks whether or not values of the extracted feature values take abnormal values to check whether or not there is abnormality (failure) in each physical sensor 13a and . . . (step S36).

When the abnormality detecting unit 107 determines that there is abnormality in one of the physical sensors 13a and . . . (step S37, NO), the abnormality detecting unit 107 outputs a warning indicating abnormality content (step S38). For example, the abnormality detecting unit 107 outputs a warning indicating abnormality content predicted according to a type of a feature value whose value is determined to be abnormal. Further, when the abnormality detecting unit 107 determines that there is abnormality in one of the physical sensors 13a and . . . , the abnormality detecting unit 107 or the feature searching unit 104 determines whether or not it is possible to continue processing of searching for (identifying) the identification information (ID) according to the abnormality content (step S39). When it is determined that it is not possible to continue the search processing (step S39, YES), the identifying unit 14 finishes the sorting processing.

When it is determined that there is no abnormality in each physical sensor 13a and . . . (step S37, YES), the feature extracting unit 101 supplies the various feature values extracted from the object, to the feature searching unit 104. Further, when it is determined that it is possible to continue the processing of searching for the identification information (ID) after it is determined that there is abnormality in one of the physical sensors 13a and . . . (step S39, NO), the feature extracting unit 101 supplies the various feature values extracted from the object, to the feature searching unit 104. In this case, the feature searching unit 104 may obtain feature values extracted from a physical quantity other than a physical quantity detected by a physical sensor whose abnormality is determined.

When obtaining the various feature values extracted from the detection data of the object, the feature searching unit 104 performs voting processing on identification information (ID) corresponding to values of the feature values obtained from the object and values in a predetermined range around the values of the feature values referring to each feature value table 105 (105a and . . . ) corresponding to the various feature values (step 40). That is, the feature searching unit 104 prepares the vote table 106 for identifying the identification information (ID) of the object, and votes on each of various feature values. For example, in the vote table 106, the feature searching unit 104 votes (adds) per each of various feature values a value of M[0] on the identification information (ID) registered in association with the value of the feature value obtained from the object, and votes (adds) a value M[n] on an ID registered in association with a value spaced "n" apart from the value of the feature value obtained from the object.

When voting on all feature values is finished, the feature searching unit 104 selects identification information (ID) as an identification result based on the voting result in the vote table 106 (step S41). For example, the feature searching unit 104 selects identification information (ID) whose vote count is maximum as an identification result. Further, the feature searching unit 104 may select identification information (ID) whose vote count is not less than a predetermined reference value as an identification result. Furthermore, the feature searching unit 104 may select identification information (ID) whose vote count is maximum and whose vote count is not less than a predetermined reference value as an identification result.

In addition, when a plurality of pieces of identification information (ID) is selected as identification results, the feature searching unit 104 may determine the identification result referring to a voting result of specific feature value. For example, a priority to determine an identification result of the various feature values is set. When a plurality of pieces of identification information (ID) is selected as identification results, one piece of identification information (ID) may be determined as an identification result referring to the voting result with respect to a feature value of a higher priority.

When the identification information (ID) as the voting result is selected, the abnormality detecting unit 107 checks whether or not there is abnormality based on the feature values obtained from the object (step S42). For example, the abnormality detecting unit 107 checks abnormality of each feature value according to whether or not a value of a difference between a value of a feature value of the selected identification information (ID) registered in the feature database 103 (i.e., the value of the feature value obtained in the first sorting processing) and a value of a feature value obtained by the sorting processing (the value of the feature value obtained in the second sorting processing) is within a threshold.

When the value of the difference of some feature values exceeds the threshold, the abnormality detecting unit 107 outputs a warning indicating abnormality content corresponding to types of feature values whose value of the difference exceeds the threshold (step S44). For example, the abnormality detecting unit 107 holds abnormality content predicted when a value of a difference exceeds the threshold, per type of a feature value to output a warning indicating abnormality content corresponding to the type of the feature value whose value of the difference exceeds the threshold. Further, when the abnormality detecting unit 107 determines that there is abnormality in one of feature values, the abnormality detecting unit 107 or the feature searching unit 104 determines whether or not it is possible to continue processing of searching for (identifying) identification information (ID) according to abnormality content (step S45). When it is determined that it is not possible to continue the search processing (step S45, YES), the identifying unit 14 finishes the sorting processing.

When it is determined that there is no abnormality in the various feature values (step S43, YES) or when it is determined that it is possible to continue the processing of searching for the identification information (ID) after it is determined that there is abnormality in one of the feature values (step S45, NO), the feature searching unit 104 determines the identification information (ID) selected from the voting result as the identification information (ID) of the object (step S46). When the identification information (ID) of the object is determined by the identification processing, the feature searching unit 104 notifies the determined identification information (ID) as the identification information (ID) of the object to the determining unit 15.

When receiving a notification of the identification information (ID) of the object, the determining unit 15 specifies the sorting information of the object based on the notified identification information (ID) (step S47). That is, the determining unit 15 specifies the sorting information of the object of the identification information (ID) registered in the sorting database 16 based on the identification information (ID) notified by the identifying unit 14. When specifying the sorting information of the object, the determining unit 15 notifies the specified sorting information of the object to the sorting control unit 17. The sorting control unit 17 controls the sorting unit 18 such that the object is sorted to a sorting destination based on the sorting information specified by the determining unit 15 (step S48).

The sorting device 2 executes processing in above steps S31 to S48 with respect to each object until the sorting processing with respect to objects set to the supplying unit 11 is finished or there is no more object (step S49, NO).

According to the above processing, in the second sorting processing performed on objects, the sorting device extracts values of various feature values from the physical quantity of the object detected by each physical sensor, votes on each of the various feature values referring to the feature database, and determines identification information (ID) of the object based on the voting result. Consequently, the sorting device can identify objects without printing, for example, barcodes on each object, and realize processing of precisely identifying objects by voting on each of various feature values.

The embodiment of the present invention has been described. However, this embodiment is presented as an example, and is not intended to limit the scope of the invention. This novel embodiment can be carried out in other various modes, and can be variously omitted, replaced and changed in a range which does not deviate from the spirit of the invention. The embodiment and modification of the embodiment are incorporated in the scope and the spirit of the invention, and is incorporated in the range equivalent to the invention recited in the claims.

What is claimed is:
1. A sorting device comprising:
 a plurality of sensors which detects physical quantities from an object, respectively;
 a feature value extracting unit which extracts values of a plurality of types of feature values from the physical quantities detected from the object by the plurality of the sensors;

a feature searching unit which specifies identification information of the object based on the values of the plurality of types of feature values extracted by the feature extracting unit with reference to a feature database which associates the values of the plurality of types of feature values and the identification information of the object in advance and stores the values of the plurality of feature values and the identification information of the object;

a determining unit which specifies sorting information of the object based on the identification information of the object specified by the feature searching unit with reference to a sorting database which associates the identification information of the object and the sorting information in advance and stores the identification information of the object and the sorting information; and a sorting unit which sorts the object based on the sorting information specified by the determining unit;

wherein the feature searching unit votes on the identification information of the object corresponding to the values of the feature values extracted by the feature extracting unit, in a vote table in which a vote value for identification information of each object is recorded, and specifies the identification information of the object based on a voting result of the vote table with reference to the feature database.

2. The sorting device according to claim 1, wherein the feature searching unit votes on the identification information of the object corresponding to the values of the feature values extracted by the feature extracting unit, and also votes on identification information of an object corresponding to values of feature values in a predetermined range based on the values of the feature values extracted by the feature extracting unit.

3. The sorting device according to claim 2, wherein the value which the feature searching unit votes on the identification information of the object which corresponds to the values of the feature values extracted by the feature extracting unit is maximum among values which are voted on the identification information of the object corresponding to the values of the feature values in the predetermined range based on the values of the feature values extracted by the feature extracting unit.

4. The sorting device according to claim 1, wherein the feature searching unit selects identification information of an object whose vote value is maximum in a voting result in the vote table, as the identification information of the object whose physical quantities are detected by the sensors.

5. The sorting device according to claim 4, wherein the feature searching unit selects identification information of an object whose vote value in the voting result in the vote table is maximum and not less than a predetermined reference value, as the identification information of the object whose physical quantities are detected by the sensors.

6. The sorting device according to claim 1, further comprising:

a feature registering unit which associates the values of the plurality of types of feature values extracted by the feature value extracting unit and the identification information of the object whose values of the plurality of types of feature values are extracted, and registers the values of the plurality of types of feature values and the identification information of the object in the feature database;

a scanner which acquires an image of the target; and a video coding terminal which associates sorting information of the object which is recognized from the image of the object by an operator and the identification information of the object, and stores the sorting information of the object and the identification information of the object in the sorting database;

wherein the determining unit includes a recognizing unit which recognizes sorting information allocated to the object from the image of the target, and wherein the determining unit determines the sorting information of the object based on a recognition result by the recognizing unit, when the sorting information of the object is determined, the determining unit associates the identification information of the object and the sorting information, and stores the identification information of the object and the sorting information in the sorting database, and when the sorting information of the object is not determined, the determining unit supplies the image of the object and the identification information of the object to the video coding terminal.

7. The sorting device according to claim 6, wherein the feature database includes a plurality of feature value tables which is provided per type of a feature value, and in which the identification information of the object is associated with a value of a feature value and the value of the feature value and the identification information of the object are registered, and the feature registering unit associates the identification information of the object with the values of the feature values extracted by the feature value extracting unit and registers the values of the feature values and the identification information of the object in each of the plurality of feature value tables in the feature database.

8. The sorting device according to claim 7, wherein, every time the feature extracting unit extracts a feature value from the object in first sorting processing, the feature registering unit associates the identification information of the object with the values of the feature values extracted by the feature extracting unit, and registers the identification information of the object in the feature value table.

9. The sorting device according to claim 1, further comprising an abnormality detecting unit which, when the feature searching unit specifies identification information of the object and when a value of a difference between a value of a feature value associated with the identification information of the object specified by the feature searching unit and the value of the feature value extracted by the feature extracting unit exceeds a predetermined threshold, detects abnormality related to the feature value.

10. The sorting device according to claim 9, wherein the abnormality detecting unit issues a warning indicating abnormality content according to a type of a feature value whose value of the difference exceeds the threshold.

11. The sorting device according to claim 1, wherein the plurality of the sensors includes a sensor which measures a weight of the object.

12. The sorting device according to claim 1, wherein the plurality of the sensors includes a sensor which measures a size of the object.

13. A sorting method comprising:

extracting a plurality of types of feature values from physical quantities of an object detected by a plurality of sensors which detects the physical quantities;

specifying identification information of the object based on values of the plurality of types of feature values extracted from the object with reference to a feature database which associates the values of the plurality of types of feature values and the identification information of the object and stores the values of the plurality of feature values and the identification information of the object;

determining sorting information of the object based on the specified identification information of the object with reference to a sorting database which associates the identification information of the object and the sorting information and stores the identification information of the object and the sorting information;

sorting the object based on the determined sorting information;

setting a vote table in which a vote value is recorded, to identification information of each object;

voting on the identification information of the object corresponding to the values of the feature values obtained from the object, in the vote table with reference to the feature database; and specifying the identification information of the object based on a voting result in the vote table.

14. The sorting method according to claim 13, further comprising:

associating the values of the plurality of types of feature values extracted from the object and the identification information of the object, and registering the values of the plurality of types of feature values and the identification information of the object in a feature database;

acquiring an image of the object;

recognizing sorting information allocated to the object from the image of the object; and determining the sorting information of the object recognized;

when the sorting information of the object is determined, associating the sorting information and the identification information of the object, and storing the sorting information and the identification information of the object in the sorting database;

when the sorting information of the object is not determined, the sorting information allocated to the object being determined from the image of the object by an operator, associating the sorting information of the object which is determined by the operator and the identification information of the object, and storing the sorting information of the object and the identification information of the object in the sorting database.

15. The sorting method according to claim 13, further comprising, when identification information of the object is specified and when a value of a difference between a value of a feature value registered in the feature data base and associated with the specified identification information of the object and the value of the feature value extracted from the object exceeds a predetermined threshold, detecting abnormality related to the feature value.

* * * * *